United States Patent [19]

Takahashi et al.

[11] Patent Number: 4,853,752
[45] Date of Patent: Aug. 1, 1989

[54] IMAGE PROCESSING METHOD

[75] Inventors: Tohru Takahashi, Tokyo; Nobuo Kitajima, Toride; Naoto Kawamura, Yokohama, all of Japan

[73] Assignee: Canon Kabushiki Kaisha, Tokyo, Japan

[21] Appl. No.: 149,892

[22] Filed: Jan. 27, 1988

Related U.S. Application Data

[63] Continuation of Ser. No. 928,621, Nov. 4, 1986, abandoned, which is a continuation of Ser. No. 846,493, Mar. 26, 1986, abandoned, which is a continuation of Ser. No. 753,257, Jul. 9, 1985, abandoned.

[30] Foreign Application Priority Data

Jul. 13, 1984 [JP] Japan .................................. 59-146213

[51] Int. Cl.[4] .............................................. G03G 15/00
[52] U.S. Cl. ............................................ 355/77; 355/55; 355/204; 355/243
[58] Field of Search ....................... 355/7, 3 R, 55, 56, 355/40, 77, 14 R

[56] References Cited

U.S. PATENT DOCUMENTS

| 4,360,883 | 11/1982 | Ejiri et al. ............................. 355/7 |
| 4,388,386 | 6/1983 | King et al. ......................... 355/40 X |
| 4,397,543 | 8/1983 | Kolbe et al. ...................... 355/77 X |
| 4,580,171 | 4/1986 | Arimoto ............................. 358/280 |
| 4,699,500 | 10/1987 | Lubberts et al. ......................... 355/4 |

Primary Examiner—A. C. Prescott
Attorney, Agent, or Firm—Fitzpatrick Cella Harper & Scinto

[57] ABSTRACT

An enlarged image of an original image is reproduced by enlarge-processing image data of divisional areas of the original image and sequentially printing out the image data.

21 Claims, 6 Drawing Sheets

IMAGE PROCESSING METHOD

This application is a continuation of application Ser. No. 928,621 filed Nov. 4, 1986, which was a continuation of Ser. No. 846,493, filed Mar. 26, 1986, which was a continuation of Ser. No. 753,257, filed July 9, 1985, all now abandoned.

BACKGROUND OF THE INVENTION

1. Field of the Invention

The present invention relates to a image processing method, and more particularly to an image processing method which enables large size image reproduction.

2. Description of the Prior Art

In the past, a large size image for advertisement or decoration displayed on a wall of a building or a gymnasium was manually drawn, or a silver halide photograph or a printed material. Recently, a method for printing an image by an ink jet method on a sheet wrapped on a large diameter drum has been proposed.

However, in this method, a printer is larger than a size of a print paper and operability is poor. The size of the print paper is limited to 5 m×4 m at largest.

SUMMARY OF THE INVENTION

It is an object of the present invention to provide an image processing method which enables reproduction of a large size image.

It is another object of the present invention to provide an image processing method for enlarging image data of portions of an original image and sequentially outputting print data to reproduce a larger image than the original image.

It is another object of the present invention to provide a print system for printing partial images of an original image on print papers and joining the print sheets to form a large size image.

It is another object of the present invention to provide an image processing method for outputting identification data for each printing-out such a addresses for portions of an original image.

It is another object of the present invention to provide a printer which prints out address data on print sheets for portions of an original image.

It is another object of the present invention to provide a printer which prints out an image on each print sheet with a predetermined margin.

It is another object of the present invention to provide a printer which prints out an identification code in a margin of each print sheet.

It is another object of the present invention to provide a printer which prints out print data in a selected order.

DETAILED DESCRIPTION OF THE PREFERRED EMBODIMENTS

Figure 1:
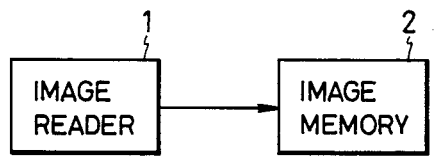
FIG. 1 is a block diagram of a file.
Figure 2:
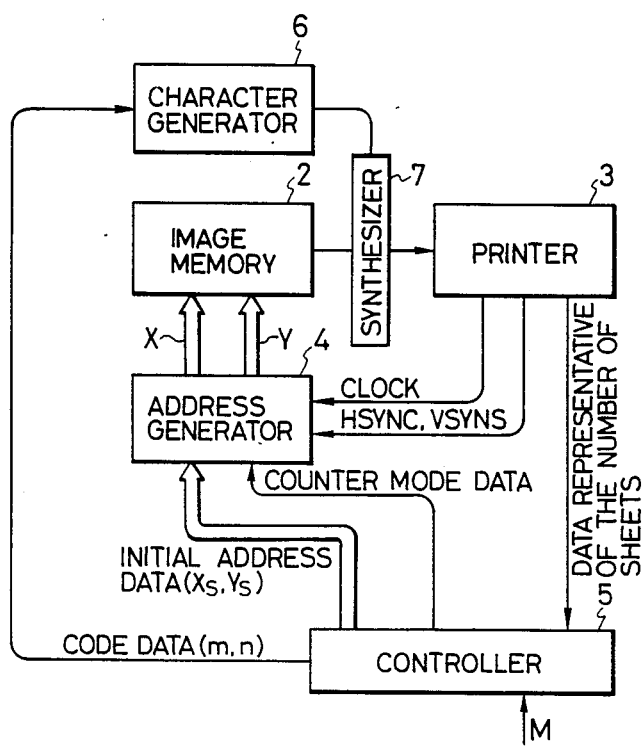
FIG. 2 is a block diagram of a printer.

FIGS. 1 and 2 show control block diagrams for sequentially printing partial images from an original image.

In FIG. 1, the original image of a document on a platen glass is read by a reader or scanner 1 and filed in an image memory 2. The reader 1 converts document information to an image data by a line sensor such as a CCD. The memory 2 is a one-page memory for storing the image data in a bit map.

In FIG. 2, the image data is read from the memory 2 portion by portion, the partial data are enlarged and identification codes are added thereto, and they are sequentially printed out.

A large size print may be formed by printing partial images on small size print sheets and sequentially joining the print sheets. In order to allow joining of the print sheets, it is necessary that each print sheet contains an image which is sufficient enough to allow identification of the image on the print sheet. Accordingly, the partial image to be printed on each print sheet must have a certain size. For example, when a 10 m×10 m large size image is to be reproduced, approximately 1700 print sheets are required if size A4 print sheets are used. As a result, many of the images on the respective size A4 print sheets do not contain identifiable images, and it is almost impossible to exactly joint those print sheets.

This problem may be resolved by printing identification codes (address codes).

In FIG. 2, a laser beam printer 3 prints an image in accordance with the image data from the memory 2. The printer 3 generates a horizontal synchronization signal HSYNC (FIG. 9) for each line scan of a laser beam and generates a vertical synchronization signal VSYNC for each feed of the print sheet. The printer 3 further generates a clock signal CLOCK in synchronism with a video pixel signal. An address generator 4 generates address data X and Y for selecting partial images in the memory 2 and reading out pixel data for each line, and has address counters for counting the address data X and Y. It carries out an enlarging processing (addition of data) under the control of the counters. The address data X corresponds to a main scan and is determined by counting the CLOCK signal, and the address data Y corresponds to a sub-scan and is determined by counting the HSYNC signal. The data can be expanded by a factor of two by reading the data at the same address twice. A character generator 6 imparts an identification code to each print paper. A character image data represented by pixels is combined with the data from the image memory by a synthesizer 7. A controller 5 sets initial address data Xs and Ys in the address generator 4. It also resets the counters for each count mode of the address counters (divisional area), sets the counters to a scale-of-M mode (mode of base M) in accordance with a magnification M, and outputs a character generator code of the character generator. The controller 5 may be a computer having a memory storing therein a program shown by a flow chart of FIG. 3.

In operation, in order to print out partial images of the original image stored in the memory 2, the controller 5 sends the initial address data Xs and Ys to the address generator 4 to designate a first partial image of the original image. The printer 3 sends the horizontal synchronization signal HSYNC and the vertical synchronization signal VSYNC to the address generator 4. In response to the synchronization signals, the address generator 4 sends the initial address data X and Y to the image memory 2. On the other hand, the controller 5 sends the code data of area address signals m and n to the character generator 6, which generates the character image signal corresponding to m and n, in synchronism with the readout of the partial image from the memory or the outputting of a margin. The generated character and the partial image at the designated address are combined in the synthesizer and the output thereof is supplied to the printer 3. In this manner, the divisional image is enlarged to the size of the print sheet. The above print operation is sequentially repeated for all of the partial images of the original image.

When the printing for the first sheet is started or completed, the controller 5 sends sheet count data N to the printer 3, and a memory address for the second sheet and count mode data are sent to the address generator 4 and the character generator 6. The second sheet image data is enlarge-printed in the same manner as the first sheet. The memory areas for the third, fourth, ... sheets are sequentially designated and the corresponding divisional images are printed out together with the area addresses m, n.

Figure 3:
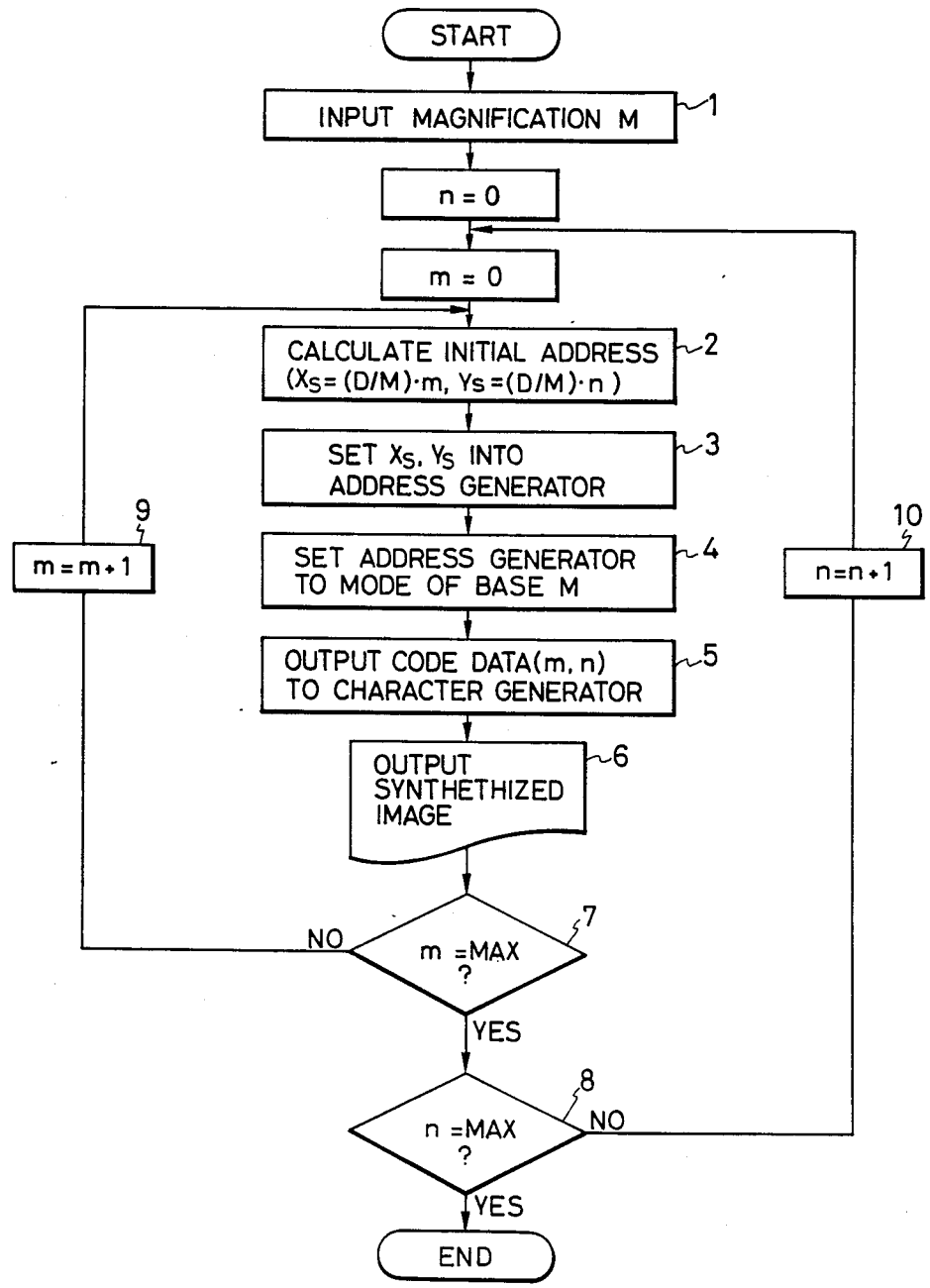
FIG. 3 is a flow chart.

FIG. 3 is a flow chart of the control process. A magnification M is selected based on the size of the original image, the size of the large image to be finally reproduced and the size of each print sheet (step 1). Thus, the X addresses m and the Y addresses n of the divisional areas are determined. For example, assuming that the size of the original image and the size of the print sheet are equal and the enlargement by the factor of two in X and Y directions are required, the original image is divided into four areas. Thus, m, n are (0,0), (1,0), (0,1) and (1,1). Assuming that there are 2500 (=D) addresses in X and Y directions, the start addresses of the divisional areas are (0,0), (1250, 0), (0, 1250) and (1250, 1250). In this manner, the start (initial) address (D/M)·m, (D/M)·n are calculated (step 2), address data Xs and Yx are set into the address counter (step 3), and the scale-of-M (mode of base M) count mode is set in the address counter (step 4). Accordingly, the address in the X direction is reset to zero at every 1250 increments. The data at each address (X and Y directions) is read twice to enlarge the image by the factor of two. The code m, n is sent to the character generator for each divisional area (step 5) and it is converted to a character, which is combined (or synthesized) with the image data in synchronism with the area to which the character is to be added (step 6). The divisional areas are printed out in the X direction first, and then in the Y direction (e.g. (0, 0), (1, 0)) (Steps 7-10).

In the step 6, the divisional image at (0, 0) is printed out. When the line data at the address 1249 in the Y direction has been outputted, the second divisional image (1, 0) is to be printed out (step 9). The printing of the second divisional image may be automatically started or it may be started by a manual print command. After the divisional image at (1, 0) has been printed out, the third divisional image at (0, 1) is printed out, and then the fourth divisional image at (1, 1) is printed out (step 10).

Figure 4:
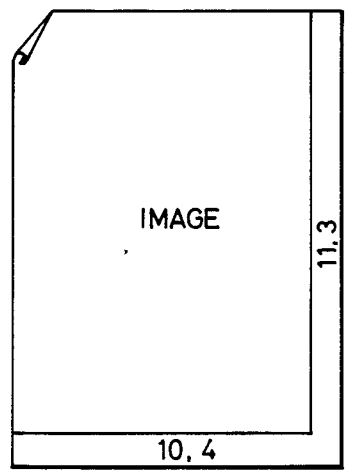
FIG. 4 illustrates a margin.

As shown in FIG. 4, a right margin and a bottom margin may be left with the remaining area being the image area. On the right margin, the address of the divisional image to be arranged on the right is printed out, and on the bottom margin, the address of the divisional image to be arranged at the bottom is printed out. As a result, the joining of the divisional sheets is facilitated. The address of the image may be printed on an area of the image. The margin in the line direction may be formed by delaying the readout of the image data from the memory relative to the HSYNC signal, and the margin in the Y direction may be formed by delaying the readout of the image data from the memory relative to the VSYNC signal. The printer may be an electrographic printer by laser, LED or LC, a thermal transfer printer or an ink jet printer.

Figure 5:
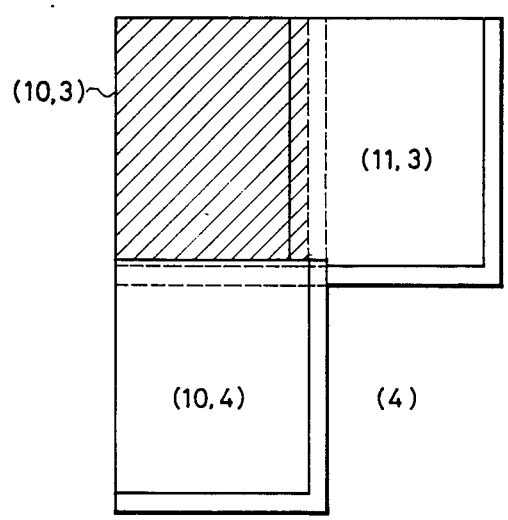
FIGS. 5, 10, 11 and 12 show joined images.

FIG. 5 illustrates joining of the output images. The margins of the print sheets are used for joining areas.

If there is no margin on the left and top edges of the image area shown in FIG. 4, the image area may be partially dropped because of skew or shift of the sheets. Such drop may be resolved by slightly overlapping the output images. To this end, the start addresses of the output image in the flow chart of FIG. 3 are changed to $$Xs' = Xs - A$$

$$Ys' = Ys - B$$

where A and B are numbers of overlapping pixels.

Figure 6:
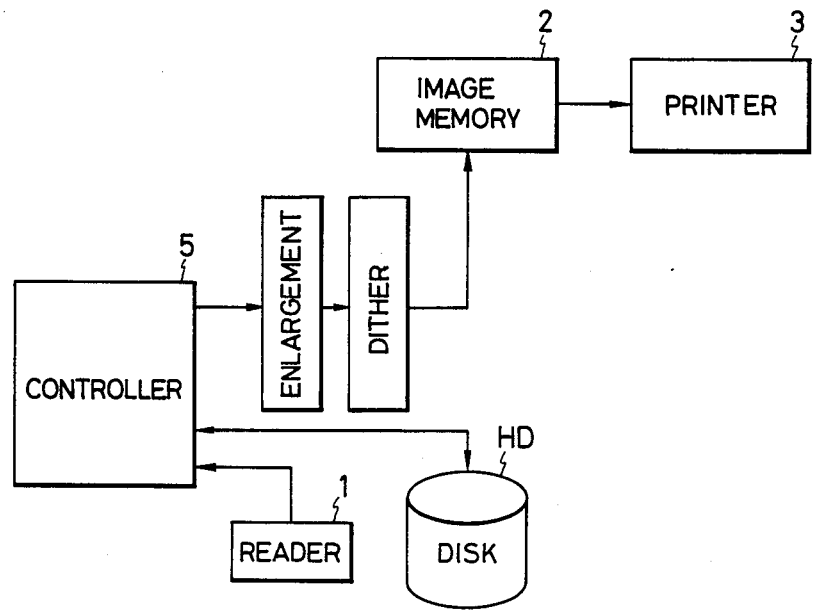
FIG. 6 is a block diagram of another file/printer.

FIG. 6 shows another embodiment. The image data read by the reader 1 is temporarily stored in a large capacity memory (e.g. magnetic disk HD) through the controllor 5. Only a necessary portion of the image data is transferred to the image memory 2 through the controller 5. The image memory 2 is a bit map memory (which stores bit data for pixels) for the printer output. The data may be transferred from the disk HD to the image memory 2 by reading out the necessary image data from the disk, expanding the data by interpolation, and dither-processing the data.

Figure 7:
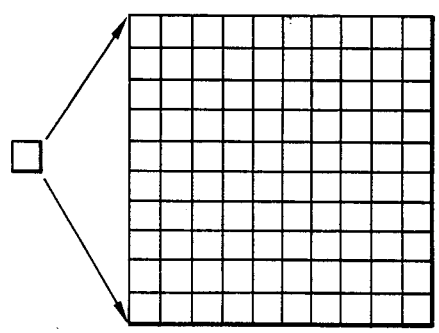
FIG. 7 is an enlarged view of an image.

Assuming that the image data is to be expanded by a factor of ten and stored in the image memory 2, a portion of the image data in the disk is read out. (When the size of the original image and the size of the print sheet are equal, one tenths of the original image is read out, and when the sizes of the original image and the print sheet are different, the proportional area of the original image is read out.) The image may be expanded by simply changing a clock rate as shown in FIG. 7, or by interpolating pixel information.

The expansion by the interpolation may be done by methods described in "Digital Image Processing" by William K. Pratt. The expansion process is carried out without changing about 8 bits/pixel data representing gray levels. For example, when the factor of expansion is 10, the same 8-bit data is serially repeated ten times. In this manner, the pixel data is expanded ten times.

After the expansion process, the image data is compared with a dither threshold pattern to produce 1 or 2-bit binary or multi-value data, which is transferred to the image data 2. It is then transferred to the printer 3. The multi-value data, for example, ternary data represents 0, 0.5, 1 and it requires two bits per pixel.

In the interpolation expansion method, the outline of the pixels in the expanded image is not clarified (when the interpolation is utilized), and the appearance of the texture pattern of the dither matrix by the expansion is prevented. Since the expanded image data is compared with the dither threshold pattern, the size of the dither threshold pattern is constant irrespective of the magnification. This method is described in Japanese Patent Application Laid-Open No. 173972/1983.

In this manner, a high quality enlarged image can be reproduced.

In this embodiment, margins may also formed and identification codes such as addresses may be printed on the print sheets.

The image can be enlarged by increasing the clock rate for writing the image data into the memory 2 to an integer multiple of the clock rate for transferring the image data from the reader 1 to the memory 2 in order to expand the image data.

Figure 8:
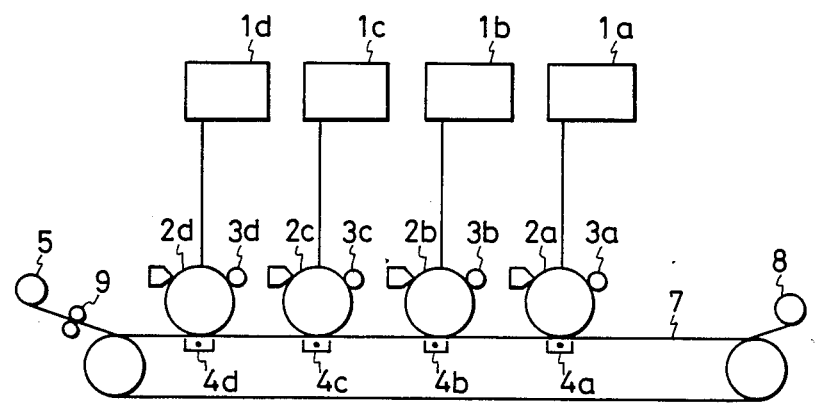
FIG. 8 is a sectional view of a printer.

FIG. 8 is a sectional view of a color printer. In the present color image recorder, color image information is produced by an electrographic copying machine (laser beam printer having a plurality of photoconductor drums is parallel, and the color images formed by the electrographic copying machine are sequentially superimposed in different colors.

Numerals 1a-1d denote scanning optical systems. Required image information in image memories for respective colors (not shown) are read out by the scanning optical systems as light beams (laser beams) which are focused onto photoconductor drums 2a-2d arranged in parallel to correspond to cyan (C), magenta (M), yellow (Y) and black (Bl). Developing units 3a-3d are arranged in the vicinity of the photoconductor drums 2a-2d and chargers 4a-4d are arranged on the sides of the photoconductor drums 2a-2d which face a convey belt 7 for conveying the print sheet. In operation, the light beams emitted from the scanning optical systems 1a-1d and modulated are focused onto the respective photoconductor drums 2a-2d, and the focused images are converted to electrostatic latent images in an electrographic process and developed by the developing units 3a-3d, and the images in different colors are sequentially transferred to a rolled paper held on the convey belt 7, by the chargers 4a-4d.

The print sheets may be cut forms. When the rolled paper is used, it is cut to an appropriate size. The transferred images on the rolled paper are fixed by the fixing unit 9 and the paper is taken up by the take-up unit 5.

Figure 9:
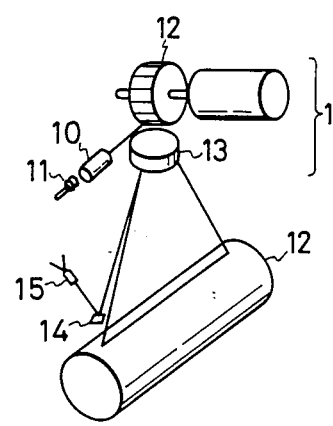
FIG. 9 is a perspective view of an optical system.

FIG. 9 is a perspective view showing a detail of one of the four scanning optical systems shown in FIG. 8. The light beam modulated by a semiconductor laser 11 is collimated by a collimater lens 10 and deflected by a rotating polygonal mirror 12. The deflected light beam is focused onto the photoconductor drum 3 by a focusing lens 13 which is called an f−θ lens, for beam scan. In the beam scan, an end of one-line scan of the light beam is reflected by a mirror 14 and directed to a detector 15. A detection signal from the detector 15 is used as the scan direction (horizontal) synchronization signal BD or HSYNC.

Figure 10:
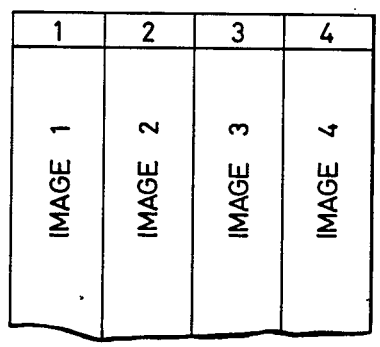
Figure 11:
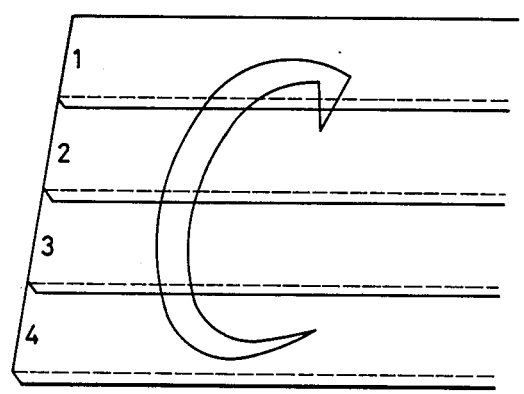

In FIGS. 10 and 11, the images on the roll papers are joined to form one sheet of image. The images on the respective roll papers have margins and have index codes printed at the tops thereof to indicate the sequence of jointing.

The longitudinally long forms shown in FIG. 10 are convenient when they are to be fixed at the tops only, and the laterally long forms shown in FIG. 11 are suitable when they are to be fixed on a wall.

In each case, a duplicated area of approximately 1 cm length may be formed at every predetermined length (for example, 1 m), the roll paper is cut along that area and joined together so that shift between images of adjacent roll papers can be compensated.

Figure 12:
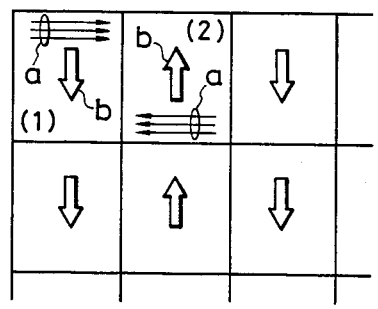

In order to reduce a density difference at the joint section, the sequence of print-out of the printer 3 may be reversed between the adjacent columns as shown in FIG. 12. As a result, the same edges of the images printed out by the printer 3 are arranged adjacently and the density difference at the joint section is reduced.

In FIG. 12, a indicates the laser scan direction (main scan), and b indicates the line print output direction (sub-scan). The printout direction for the print sheet (1) is opposite to that for the print sheet (2). Thus, the scan directions are opposite and the images at the edges of the printer 3 are arranged side by side.

What is claimed is:

1. An image processing method for reproducing a larger image than an original image by enlarging image data of divisional areas of the original image and sequentially printing out the enlarged divisional image data on respective print sheets.

2. An image processing method according to claim 1 wherein a memory storing the original image therein is sequentially addressed so that the image data of the respective divisional areas are read out and enlarged.

3. An image processing method according to claim 1 wherein identification data for each of the divisional areas of the original image is printed out on each print sheet.

4. An image processing method according to claim 3 wherein the identification data is printed out on a margin area of each print sheet.

5. An image processing method according to claim 1 wherein an image printed on each print sheet is partially overlapped.

6. An image processing method according to claim 1 wherein the image data of the original image is enlarged and then dither-processed.

7. An image processing method according to claim 4 wherein the printout is done by an electrographic laser beam printer and the margin area is determined in synchronism with a beam scan timing of said laser beam printer on a rolled paper.

8. An image processing method according to claim 7 wherein the printout is done by a color printer having a plurality of drums provided one for each color component.

9. An image processing method comprising steps of:
   printing out sequentially divisional areas of an original image on respective sheets;
   forming a margin area of a predetermined width on the respective sheets on which the divisional areas of the original image are printed; and
   printing out identification data for each of the divisional areas of the original image on the margin area of the respective sheets.

10. A method according to claim 1, wherein the divisional areas of the original image are determined on the basis of a magnification ratio.

11. A method according to claim 3 or 4, wherein said identification data is character data.

12. An image processing method comprising steps of:
    printing out a plurality of divisional areas of an original image on respective print sheets such that when the respective print sheets are appropriately arranged, the original image is formed in its entirety; and
    printing out an image associated with the divisional areas of the original image on the respective print sheets so that the image printed on each sheet is partially overlapped to facilitate the arrangement of the respective print sheets.

13. A method according to claim 1 or 9, wherein the margin of a predetermined width is formed on the print sheets on which the divisional areas of the original image are printed.

14. A method according to claim 1, 9 or 12, wherein the divisional areas of the original image are printed out in the reverse direction for each said print sheet.

15. An imaged processing method according to claim 4 or 9, wherein the margin area on which the identification data is printed out is formed in a longitudinal direction or/and a transverse direction.

16. An image processing apparatus, comprising:
process means for processing image data of a divisional area of an original image to enlarge the original image; and
means for sequentially printing out the enlarged divisional area in accordance with the data processed by said process means on respective sheets.

17. An image processing apparatus according to claim 16, wherein identification data for each of the divisional areas of the original image is printed out on each print sheet.

18. An image processing apparatus according to claim 16, wherein the identification data is printed out on a margin area of each print sheet.

19. An imaged processing apparatus according to claim 16, wherein an image printed on each print sheet is partially overlapped.

20. An image processing apparatus according to claim 16 wherein the margin area on which the identification data is printed out is formed in a longitudinal direction or/and a transverse direction.

21. An image processing apparatus according to claim 16, wherein said process means processes the image data so that a printed image may reproduce halftone images.

* * * * *

UNITED STATES PATENT AND TRADEMARK OFFICE
CERTIFICATE OF CORRECTION

PATENT NO. : 4,853,752

DATED : August 1, 1989

INVENTOR(S) : TOHRU TAKAHASHI, ET AL.

It is certified that error appears in the above-identified patent and that said Letters Patent is hereby corrected as shown below:

COLUMN 1

Line 12, "a" should read --an--.
    Line 42, "a" should read --as-- .

COLUMN 2

Line 28, "identificable" should read --identifiable--.
    Line 29, "joint" should read --join--.

COLUMN 4

Line 30, "controllor 5." should read --controller 5.--.
    Line 58, "image data 2." should read --image memory 2.--

COLUMN 5

Line 5, "formed" should read --be formed--.
    Line 17, "is parallel," should read --in parallel),--.
    Line 59, "jointing." should read --joining.--.

COLUMN 6

Line 30, "claim 1" should read --claim 1, 9 or 12,--.
    Line 33, "claim 1" should read --claim 1, 9 or 12,--.

COLUMN 7

Line 13, "imaged processing method" should read
        --image processing method--.

UNITED STATES PATENT AND TRADEMARK OFFICE
CERTIFICATE OF CORRECTION

PATENT NO.   : 4,853,752
DATED        : August 1, 1989
INVENTOR(S)  : TOHRU TAKAHASHI, ET AL.

It is certified that error appears in the above-identified patent and that said Letters Patent is hereby corrected as shown below:

COLUMN 8

Line 11, "imaged processing apparatus" should read --image processing apparatus--.

Signed and Sealed this

Twenty-eighth Day of April, 1992

*Attest:*

HARRY F. MANBECK, JR.

*Attesting Officer*     *Commissioner of Patents and Trademarks*